(12) United States Patent
Olliphant

(10) Patent No.: US 7,343,335 B1
(45) Date of Patent: Mar. 11, 2008

(54) METHOD FOR MANAGING GROUP FINANCES VIA AN ELECTRONIC NETWORK

(75) Inventor: Hugo Olliphant, San Francisco, CA (US)

(73) Assignee: eBay Inc., San Jose, CA (US)

( * ) Notice: Subject to any disclaimer, the term of this patent is extended or adjusted under 35 U.S.C. 154(b) by 938 days.

(21) Appl. No.: 09/633,962

(22) Filed: Aug. 8, 2000

(51) Int. Cl.
*G06Q 40/00* (2006.01)

(52) U.S. Cl. .............. 705/36; 705/26; 705/27; 705/35; 705/37; 705/38; 705/39; 705/40

(58) Field of Classification Search ............ 705/26, 705/27, 37, 35, 36, 39, 21, 38, 40, 41, 42, 705/43
See application file for complete search history.

(56) References Cited

U.S. PATENT DOCUMENTS

| | | | | |
|---|---|---|---|---|
| 5,864,830 A | * | 1/1999 | Armetta et al. | 705/41 |
| 5,953,710 A | * | 9/1999 | Fleming | 705/38 |
| 6,044,360 A | * | 3/2000 | Picciallo | 705/21 |
| 6,219,650 B1 | * | 4/2001 | Friend et al. | 705/36 R |
| 6,235,176 B1 | * | 5/2001 | Schoen et al. | 705/4 |
| 6,324,523 B1 | * | 11/2001 | Killeen, Jr. et al. | 705/35 |
| 6,338,047 B1 | * | 1/2002 | Wallman | 705/36 |
| 6,622,128 B1 | * | 9/2003 | Bedell et al. | 705/30 |

* cited by examiner

*Primary Examiner*—Nga Nguyen
(74) *Attorney, Agent, or Firm*—Schwegman, Lundberg & Woessner, P.A.

(57) ABSTRACT

The present invention provides a method of managing group finances via an electronic network. Transaction details are received from a member of group via an electronic network. The transaction details preferably include a shared expense containing an expense amount and at least one group member responsible for the expense. The transaction details are then assigned to the group and a payment specified by the transaction details is allocated among group members of the group. The method is repeated for a plurality of transactions. The finances of the group may also be balanced using accounting mathematics. Furthermore, an original expense value may be rounded up to a new expense value having a predefined number of decimal places, and a difference distributed between the new expense value and the original expense value to a third party.

29 Claims, 12 Drawing Sheets

Modify personal info for Hugo

Please use this page to update your profile. Only change those fields that you would like to change. Click "Submit" when you have finished.

First Name: Hugo
Last Name: Olliphant
Email Address: hugo@gmoney.co

To change your password, enter your old password here:
Old Password:
New Password: (6-15 characters, please)
Verify Password:

What if you forgot your password? That's okay, we'll test you with a secret question. Please answer one of the questions below.

Who is the object of my desire (and does my girl/boyfriend know about him/her)?

Now enter the secret answer to your question. ********
How often would you like to receive the gMoney newsletter? Quarterly

[Finish] [Cancel]

FIG. 7

SUMMARY

That email address was not found. Perhaps you'd like to try a different email address?

Summary for Hugo: you owe $1,143.31

| Hugo Real Test Data | You owe $23.21 to this group. |
[DETAILS] [REMOVE ME] [SETTLE UP]

| Hugo's Residents + | This group owes you $133.67 |
[DETAILS] [REMOVE ME] [ASKS FOLKS TO SETTLE UP]

| Hugo's Office Group3 | This group owes you $150.00 |
[DETAILS] [REMOVE ME] [ASKS FOLKS TO SETTLE UP]

| Hugo's Event Group | You are settled with this group. |
[DETAILS] [REMOVE ME]

[Add/Join a group] [Personal Options]

METHOD FOR MANAGING GROUP FINANCES VIA AN ELECTRONIC NETWORK

TECHNICAL FIELD

The present invention relates generally to electronic commerce and more particularly to online management of group finances via an electronic network.

BACKGROUND OF THE INVENTION

Recently, with the tremendous growth of the Internet, numerous Internet based companies have emerged which provide a service which allows individuals to pay all of their bills online at a single Web-site. Such companies include statusfactory.com®, paytrust.com®, and paymybills.com®, to name but a few. Individuals can have their bills redirected to one of the aforementioned companies who capture their bills and present them to the individual on a Web-site. The individual can then pay his or her bills directly through the Web-site and/or set up rules for the automatic payment of any bills received. Individuals using such sites, therefore, no longer have to review each bill sent to them from creditors, write checks out to those creditors, and post the checks to each creditor thus saving time, and costs such as stamp costs and any late payment charges should they fail to pay a bill on time. It has been estimated that about 30 million households currently make use of online banking and bill payment.

Such services, however, are typically only directed at individuals. To date, no easy means exists which addresses the problems that arise when individuals participating in group related activities spend money on behalf of the group. Group activities, such as joint ventures, ski trips, bachelor parties, shared households, office lunch groups, and clubs and organizations often lead to complicated settlement arrangements. For example, consider the life of three roommates: one person buys supplies for a housewarming party, while another pays the gas and phone bill. The third roommate pays the electric bill and for a pizza on Superbowl Sunday. The financial inter-obligations become unwieldy with only a few transactions. This problem arises any time individuals spend money together, not just in shared household situations where it is estimated that there are 74 million shared households in the U.S. (American Housing Survey for the United States: 1997), but also for office lunch groups, clubs, events, parties, wish lists, investment groups, wagering pools, organizations, clubs, or the like.

Person-to-person (P2P) payment providers such as PayPal.com® and PayMe.com® have emerged that offer payments and payment requests from one consumer to another. A popular application of this P2P technology involves the payment for goods purchased at online auction sites. While the P2P providers offer robust payment options for consumers, including a transaction history for individuals, none address the need for group accounting. These are payment solutions only and do not allow for the tracking of expenses and transactions unless a payment has occurred.

Furthermore, companies such as Intuit® offers a personal accounting software. Personal accounting software allows individuals to track their personal expenses and transactions on an on-going basis. Again, however, there is no group accounting functionality available and there are no features designed to track group expenses and group transactions.

Therefore, a convenient system whereby group members can view, split, balance a group's finances, pay group expenses, and deposit money into a group account would be highly desirable.

SUMMARY OF THE INVENTION

According to the invention there is provided a method of managing group finances via an electronic network. Transaction details are received from a member of the group via an electronic network. The transaction details preferably include a shared expense containing an expense amount and at least one group member responsible for the expense. The transaction details are then assigned to the group and a payment specified by the transaction details is allocated among group members of the group. The method is repeated for a plurality of transactions. The finances of the group may be balanced using accounting mathematics.

The invention provides a Web-based solution that allows individual group members to track and pay common expenses as well as conduct online settlements. Group members can, for example, pay into their group using a credit card or electronic check and can withdraw funds from their group via direct deposit into their bank accounts.

Event-planning firms, investment clubs, wish list companies, or any group oriented Web-site can use the system to enhance the functionality and drive repeat use of their Web-site. For example, the system enables group purchases of gifts where individuals or couples could register larger ticket items such as couches or trips, and others could contribute any amount they liked towards a group account to purchase the gift.

BRIEF DESCRIPTION OF THE DRAWINGS

For a better understanding of the nature and objects of the invention, reference should be made to the following detailed description, taken in conjunction with the accompanying drawings, in which:

FIG. 7 is an illustration of a graphical user interface of a "Member page" used in accordance with an embodiment of the invention;

FIG. 8 is an illustration of a graphical user interface of a "Group summary page" used in accordance with an embodiment of the invention;

FIG. 11 is an illustration of a graphical user interface of an "Add new transaction page" used in accordance with an embodiment of the invention;

FIG. 12 is an illustration of a graphical user interface of a "Complex transaction page" used in accordance with an embodiment of the invention;

Like reference numerals refer to corresponding parts throughout the several views of the drawings.

DETAILED DESCRIPTION OF THE INVENTION

Figure 1:
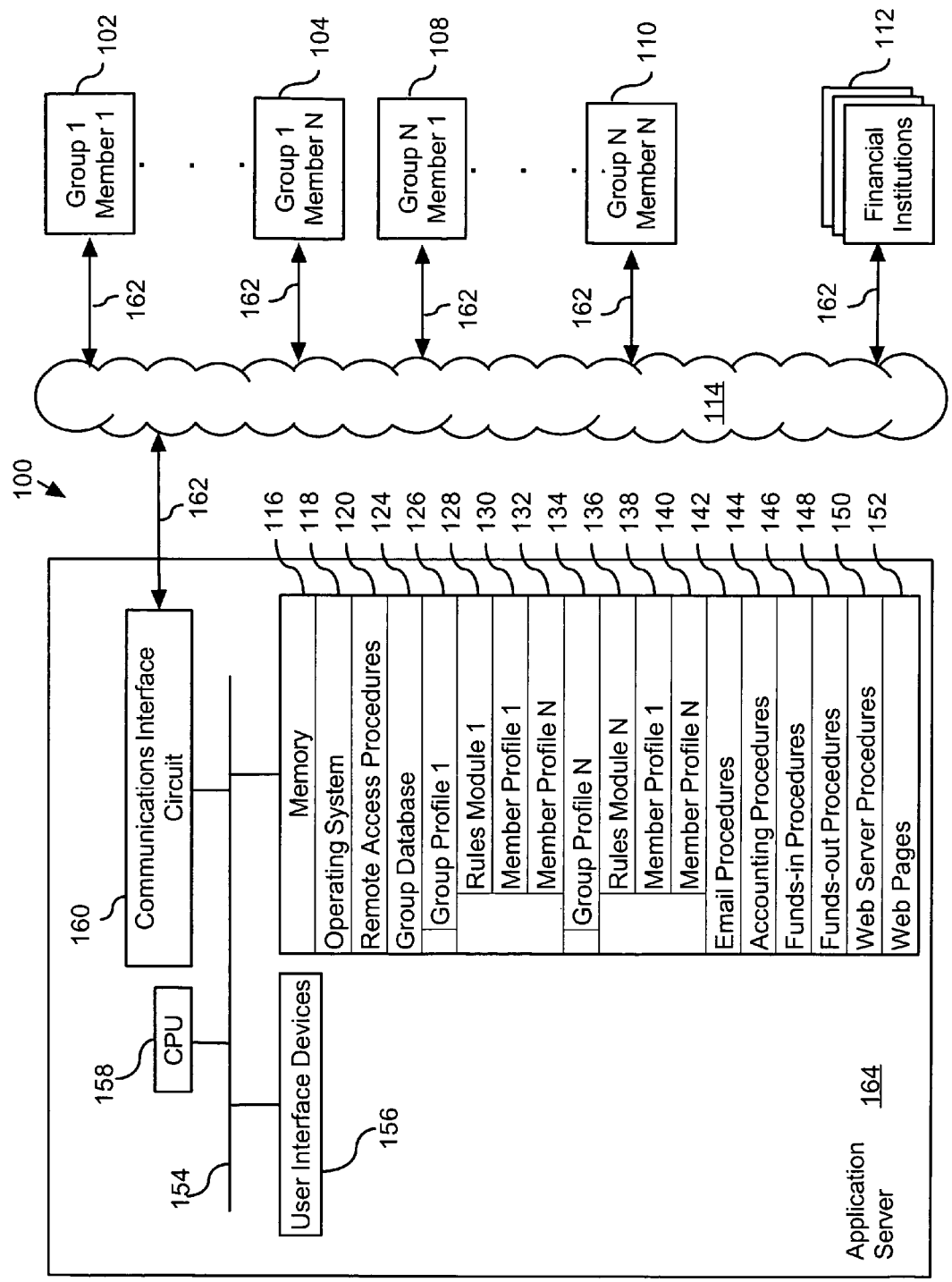
FIG. 1 is a diagrammatic view of an electronic network for managing the finances of a group in accordance with an embodiment of the present invention.

FIG. 1 is a diagrammatic view of an electronic network 100 for managing the finances of a group in accordance with an embodiment of the present invention. Network 100 comprises a series of points or nodes interconnected by communication paths. Network 100 may interconnect with other networks, contains subnetworks and may be embodied by way of a local area network (LAN), a metropolitan area network (MAN), a wide area network (WAN), or a global network (the Internet). The network 100 may further be characterized by the type of access service used, such as PSTN (Public Switched Telephone Network), ISDN (Integrated Services Digital Network), DSL (Digital Subscriber Line), ATM (Asynchronous Transfer Mode), T-carrier system, etc. In addition, network 100 may be characterized by the type of protocols used on it, such as TCP/IP (Transmission Control Protocol/Internet Protocol), NetBEUI (NetBIOS Extended User Interface), or IPX/SPX (Internetwork Packet Exchange/Sequenced Packet Exchange). Additionally, network 100 may be characterized by whether it carries voice, data, or both kinds of signals; by who can use the network 100 (whether it is public or private); and by the usual nature of its connections (e.g. dial-up, dedicated, switched, non-switched, or virtual connections).

Network 100 connects a plurality of group members 102 to 110, and financial institutions 112 to at least one application server 164. This connection is made via a communication network 114 which may for example comprise an Intranet, wireless network, or preferably the Internet. The connection is made via communication links 162, which may, for example, be coaxial cable, copper wire (including PSTN), optical fiber, wireless, microwave, or satellite links.

For ease of explanation, the individual or entity that controls the application server 164 will hereinafter be referred to as the service provider. It should be understood that the group members, financial institutions, and/or the service provider may be individuals, businesses, organizations or the like. Furthermore, the service provider and the financial institutions may be distinct entities or a single entity.

As used herein, a group member is defined as any individual who forms part of a group set up by group members with the service provider. Financial institutions, as used herein, incorporates all financial services organizations, such as banks or the like.

Application server 164 preferably comprises at least one data processor or central processing unit (CPU) 158, a memory 116, user interface devices 156, a communications interface circuit 160, and at least one bus 154 that interconnects these elements. Memory 116 preferably includes an operating system 118 (such as Windows NT™, Linux™, or MacOS™), which stores instructions for communicating, processing data, accessing data, storing data, searching data, etc. Memory 116 also includes remote access procedures 120, email procedures 142, accounting procedures 144, funds-in procedures 146, funds-out procedures 148, Web server procedures 150, Web pages 152, and a group database 124. Group database 124 preferably includes group profiles 126 and 134. Each group profile 126 or 134 preferably contains a number of member profiles 130, 132, 138, and 140. Each member profile 130, 132, 138, or 140 preferably contains member information, such as group member details, member account details, financial institution details, etc. Each group profile 126 or 134 preferably also includes a rule module 128 or 136. The various procedures and the group database 124 will be explained in further detail below.

Group members 102 to 110 typically access the communication network 114 via remote client computing devices, such as desktop computers, handheld computers, personal digital assistants (PDAs), or the like. The financial institutions 112 include a financial institution server similar to the application server 164. The client computing devices and financial institution server preferably also include a data processor or central processing unit (CPU), user interface devices, communications interface circuits, memory, and buses similar to those described in relation to application server 164.

Group members 102 to 110 preferably connect to the communication network 114 using an Internet browser, such as Microsoft's Internet Explorer® or Netscape's Navigator®, via their computing device's communication interface circuit, which preferably comprises a modem or network interface card (NIC). The path of data between the computing devices and the communication network is preferably: Internet Browser→Winsock (TCP/IP module of Windows®)→(modem or NIC)→ISP Modem or Hub→Router→Internet. Once connected to the communication network, the group members navigate to a uniform resource locator (URL) pointing to the application server's home Web-site. The application server 164 then delivers Web pages 152 using Web server procedures 150.

Figure 2:
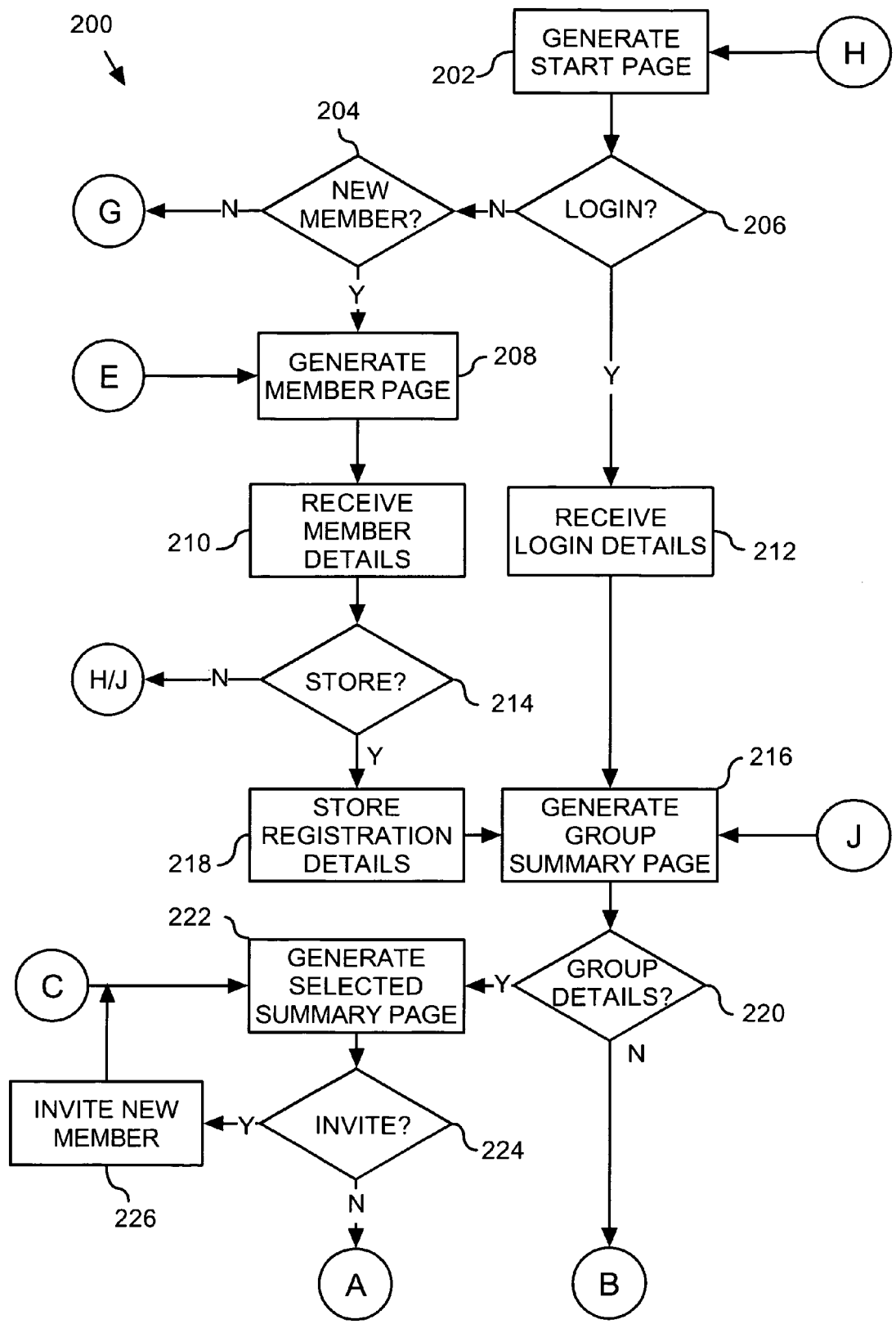
FIG. 2 is a flow chart of an application server side method of managing the finances of group in accordance with an embodiment of the present invention.

FIG. 2 is flow chart of a method for managing group finances via an electronic network according to an embodiment of the invention. The application server (164 of FIG. 1) using the web server procedures (150 of FIG. 1) and Web pages (152 of FIG. 1) generates a "home start page" (step 202) an embodiment of which is shown in FIG. 6. The system then determines whether a group member would like to log into the system (step 206). In a preferred embodiment of the invention, if a group member would like to log into the system, the system receives login details, such as a username or email address (610 of FIG. 6) and password (612 of FIG. 6), at 212, and then generates and displays a "group summary page" (step 216) an embodiment of which is shown in FIG. 8. All communication after login is secure, preferably use SSL (Secure Sockets Layer) technology. If a group member does not want to login (step 206) the system then determines if the person accessing the system is a new member (step 204). If the person accessing the system is not a new member, the system then determines if the person accessing the system would like to add to, or join, an existing group (502 of FIG. 5). If the person accessing the system is a new member, the system generates a "new member page" (step 208), an embodiment of which is shown in FIG. 7, and receives the new member's details (step 210). The system then determines (step 214) whether the person accessing the system would like to store their details or not.

If the new member would not like to store his/her details, i.e. cancels the new member application, the system either generates the start page (step 202) or if the member has modified his/her details (as explained in relation to FIG. 3), the system generates a (unmodified) group summary page (step 216). If the new member would like to store his/her details, the system stores the new member's registration details, (step 218), and then generates the group summary page (step 216). In this way a group fund is preferably established for plurality of group members.

Figure 9:
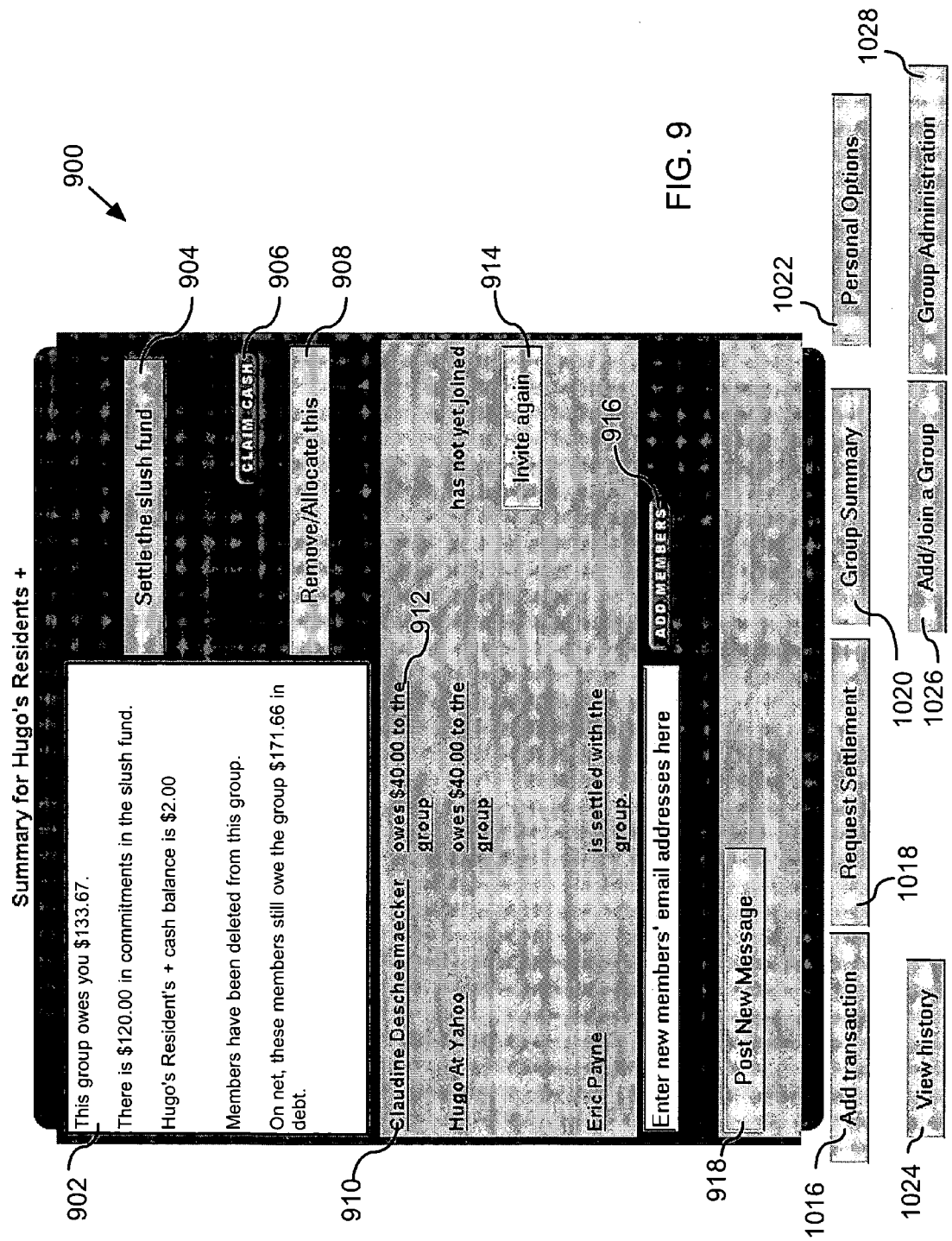
FIG. 9 is an illustration of a graphical user interface of a "Specific group's summary page" used in accordance with an embodiment of the invention.

The system then determines (step 220) whether the group member would like to view the details for any of the groups that he/she belongs to. If the group member would like to view a group's details, the system generates and displays a summary page for a selected group (step 222), an embodiment of which is shown in FIG. 9. The system then determines (step 224) whether the group member would like to invite another individual to join a group. If the group member would like to invite a new member to join a group, the new member is invited (step 226) preferably by email. This could be, for example, where a new person moves into a shared expenses apartment. After the new member has been invited to join a group the selected group's summary page is again generated and displayed (step 222). If the group member would not like to invite a new member to join a group, the system then determines if the group member would like to email another individual (306 of FIG. 3). If the group member would not like to view a group's details (step 220) the system then determines whether the group member would like to be removed from a specific group (302 of FIG. 3).

Figure 3:
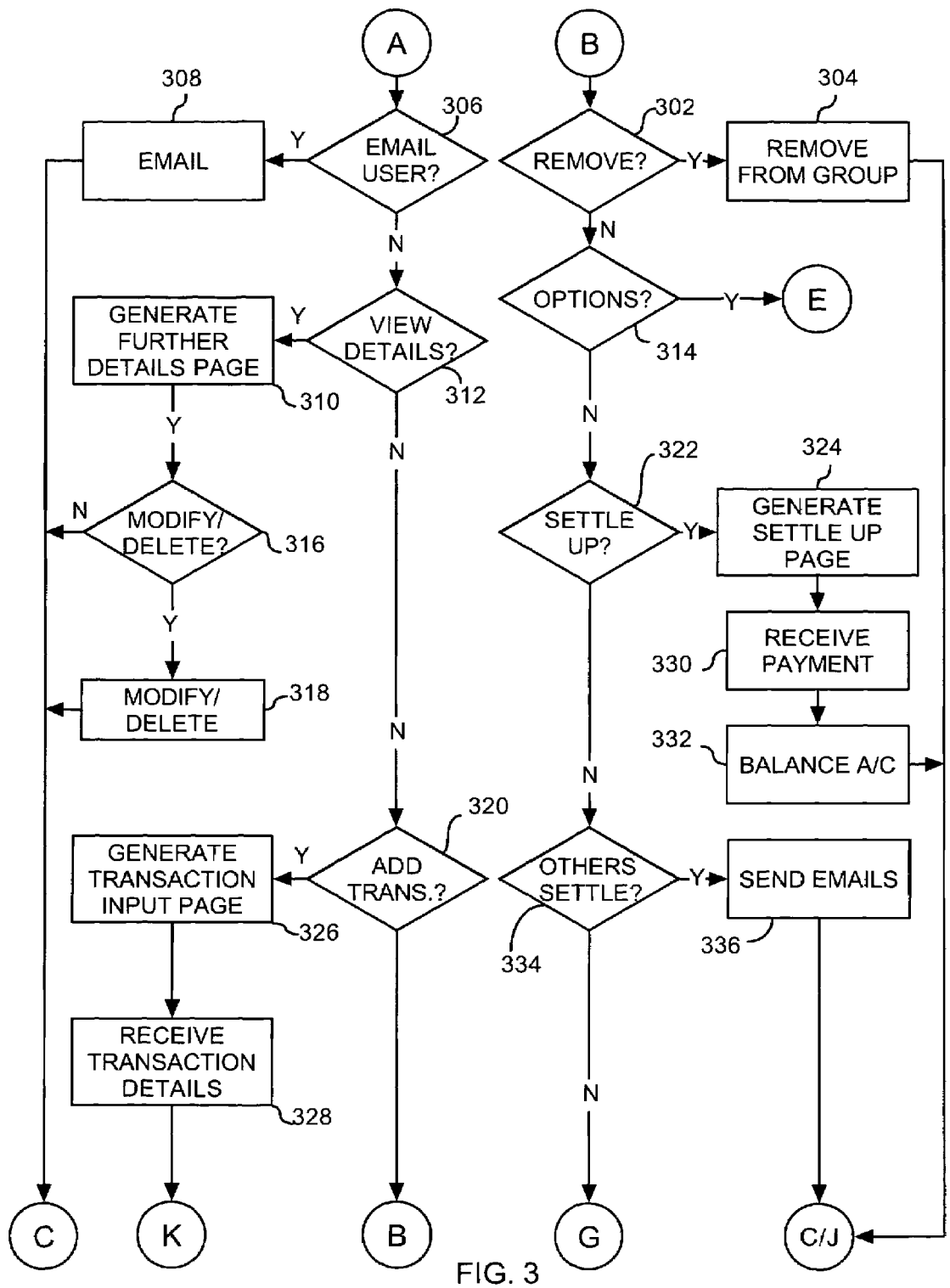
FIG. 3 is a continuation of the flow chart of FIG. 2.
Figure 10:
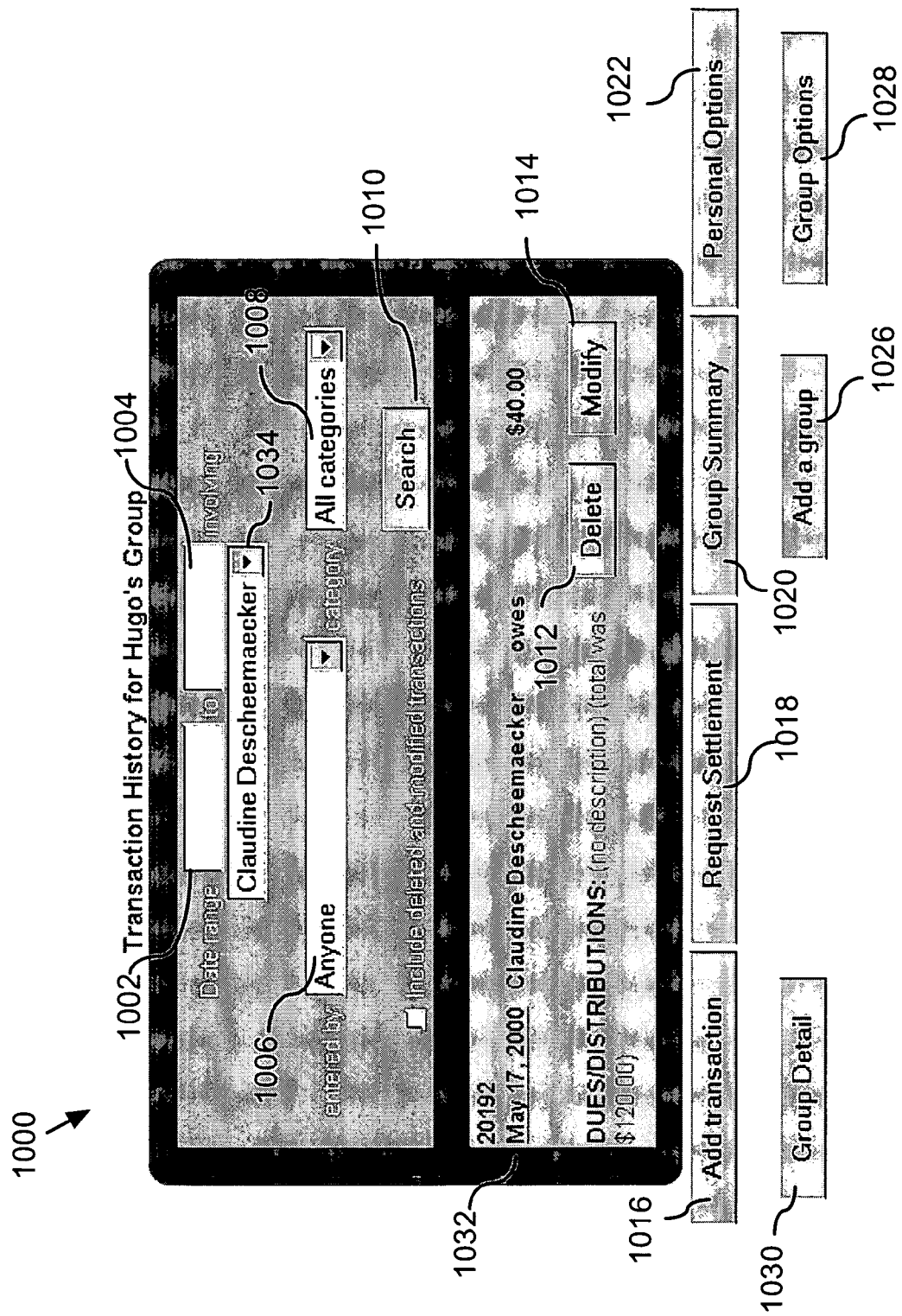
FIG. 10 is an illustration of a graphical user interface of a "Transaction history page" used in accordance with an embodiment of the invention.

FIG. 3 is a continuation of the flow chart of FIG. 2. If the group member would not like to invite a new member to join a group, the system determines if the group member would like to email another individual (step 306). This may be the case, for example, where the member would simply like to send an email to another member or members, or the group member would like to re-invite an individual to join a group. If the group member would like to send an email, an email is generated and sent (step 308) and the selected group summary page is re-displayed (222 of FIG. 2). If the member does not want to send an email, the system determines whether the member would like to view a group's transaction details (step 312). If the system determines that the member would like to view a group's transaction details, a "transaction history page" is generated and displayed to the member (step 310), an embodiment of which is shown in FIG. 10. The system then determines whether the member would like to modify or delete any transactions, at 316. If the member would not like to modify or delete any transactions, the selected group summary page is re-displayed (222 of FIG. 2). If the member would like to modify or delete any transactions, the modifications or deletions are made (step 318) after which the group summary page is re-displayed (222 of FIG. 2).

Figures 11, 12:
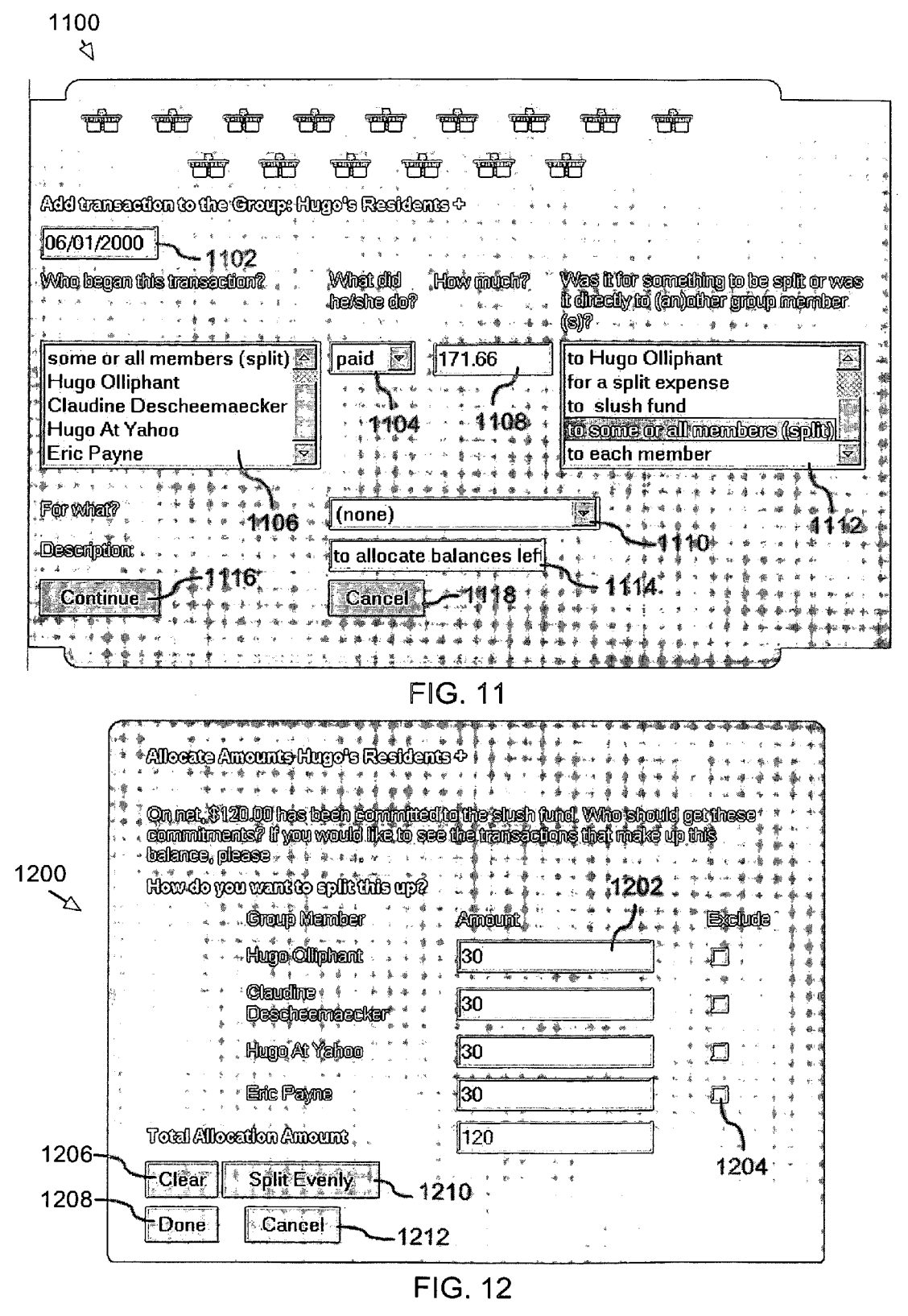

If the system determines that the member would not like to view a selected group's transaction details (step 312) the system then determines whether the group member would like to add a new transaction (step 320). The new transaction may be a new group expense or a payment from a group member to a group. If the system determines that a group member would like to add a new transaction (step 320), a "add new transaction page" is generated and displayed to the group member (step 326), an embodiment of which is shown in FIG. 11.

Once the group member has added a new transaction, the new transaction details are received (step 328) and added to that specific group's profile (128 and 134 of FIG. 1). The transaction details preferably include a shared expense of the group, containing an expense amount and at least one group member responsible for the expense. Alternatively, the transaction details may include remuneration details from a group member, such as the member's account details at a financial institution and the amount he or she should be remunerated. The system then determines if the transaction involves a simple or a complex allocation (404 of FIG. 4). If the system determines that a group member would not like to add a new transaction (step 320), the system determines whether the user would like to remove a member from the group (step 302).

Figure 4:
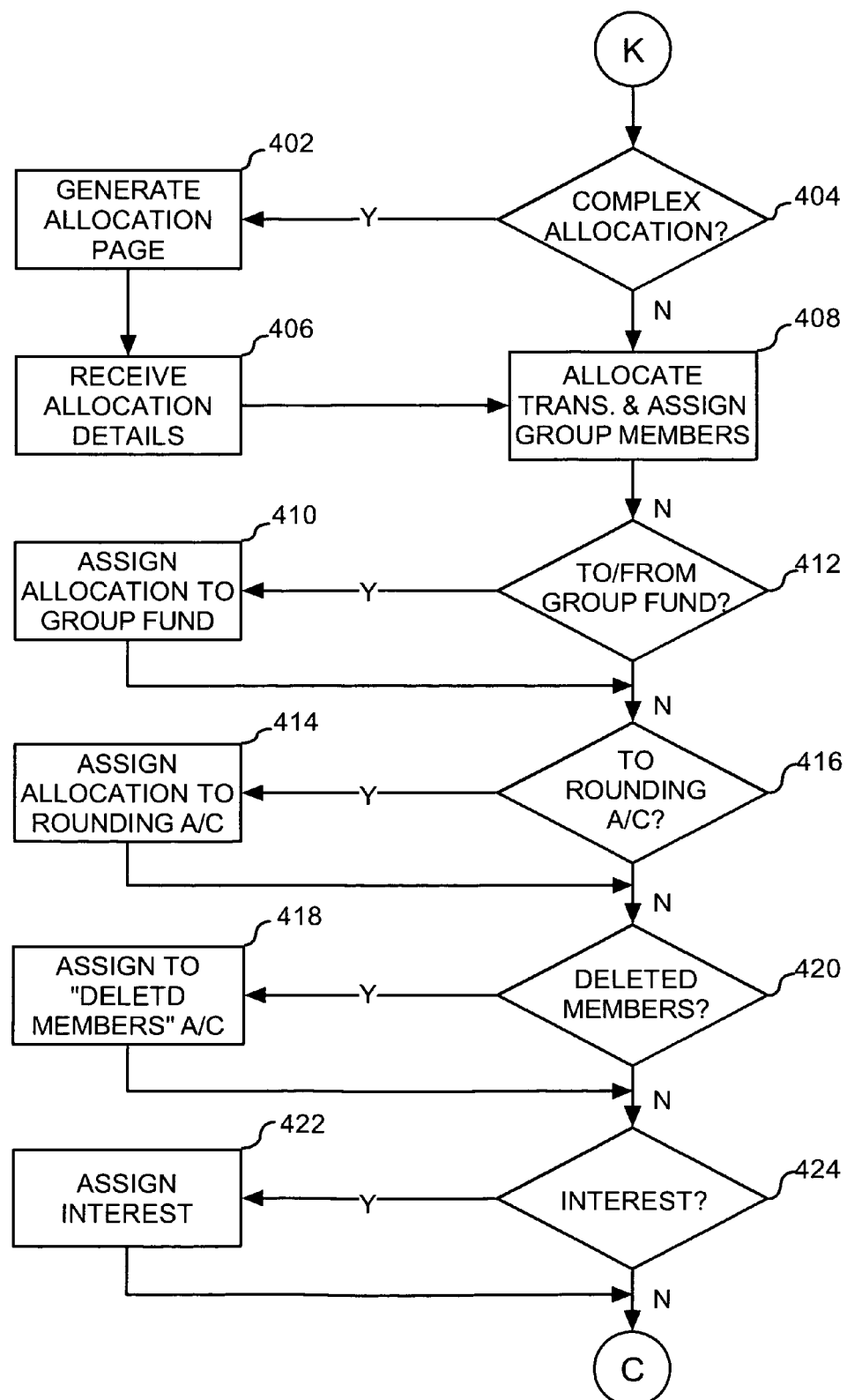
FIG. 4 is a continuation of the flow chart of FIG. 3.

FIG. 4 is a continuation of the flow chart of FIG. 3. If the system determines that the transaction involves a complex allocation (step 404), such as splitting or dividing financial obligations like an expense among some or all of a group's members, a "complex allocation page" is generated and displayed (step 402). Once the member has submitted the complex allocation details, these details are received (step 406). In either the complex or simple allocation cases, the transaction is processed (step 408) using the rule modules (128 and 136 of FIG. 1) for each group, together with the accounting procedures (144 of FIG. 1). This processing of the transaction generally includes allocating each transaction to a group and assigning payments included in the transaction among group members. This may preferably include debiting a group fund with an expense specified in the transaction details and allotting the expense among the group members in a manner specified in the transaction details. Alternatively, this may include crediting the group fund with remuneration specified in the transaction details and allotting the remuneration among the group members in a manner specified in the transaction details. This allocation and assignment is described in further detail below in relation to FIG. 11.

The system then determines whether the transaction involves a payment to or from a group fund (step 412). A group fund is a fund set up by the group members for a special purpose. Such a fund might be a "car pool fund", "a gift fund", "a phone bill fund" or any of a variety of account used to collect commitments and unallocated expenses. For example, a fund might be set up to purchase a gift where everyone is asked to put in $50 beforehand. In this case, a commitment of $50 is collected in the group fund from each member. If the transaction involves a payment to or from a group fund, then an allocation to a specific group fund and an assignment between individual group members of that group fund is made (step 410). All financial balancing calculations are preferably undertaken using standard accounting mathematics.

During any of its accounting calculations, the system preferably round off all original expense values to a new expense value having a predefined number of decimal places, and distributes a difference between the new expense value and the original expense value to a rounding account of a third party, preferably the service provider. For example, say an expense of $10 must be split between three group members, John, Nancy and Susan. Each group member would, therefore, owe $10/3=$3.333 . . . The system may round the amount owed to a set number of decimal places. If John paid $10 for an expense to be split among John, Nancy, and Susan, expense is rounded up to $3.34 for each person. If, however, John owes $10 for an expense to be split among John, Nancy, and Susan, then the expense is rounded down to $3.33, which is paid to each group member. In both cases, the remainder of $0.1 is credited to a rounding account for the benefit of a group or a third party, such as the service provider. After the system determines whether the transaction involves a payment to or from a group fund (step 412), the system determines whether during any of its accounting calculations, a remainder was generated (step 416) and if so assigns the remainder to the rounding account (step 416).

The system then determines (step 420) whether any members have been deleted or have left a group. When members are deleted from the group, their balance is assigned to a "Deleted Members" account for non-members (step 418). The group may allocate those funds whenever they wish. This allocation may be a proportional split between group members or may vary depending on the rules module (128 or 136 of FIG. 1) set up for that group.

The system then preferably determines whether according to the rules module, a group member should be charged interest for paying late or should be paid interest for paying early. Such a charge or payment of interest is established either by the group members or by the service provider. For example, an investment group may require an appropriate economic return to members that pay for stocks on behalf of other members. An alternative embodiment utilizes an interest spread where a group member is charged a higher interest for a late payment than that payed out to an group member who makes an early payment. A third party, such as the service provider, retains the difference between the interest received and the interest payed out (the interest difference). For example, a group member who makes an early payment may be paid say 19% interest on the funds payed until such time as the expense is due. A group member who pays after the expense is due may be charged 21% interest until such time that he/she pays the group. The difference between the 21% and the 19%, i.e. 2%, is kept by the service provider. Therefore, the system determines (step 424) whether any interest is due, and assigns the interest to the necessary accounts (step 422). In the case where an interest spread is used, the interest difference may be assigned to a separate interest account or to the rounding account. The system then generates and displays the summary page (step 222 of FIG. 2).

Returning to FIG. 3, if the system determines that the group member would like to be removed from a specific group (step 302), that person is removed from the group (step 304). The rules module for that group may be set up so that only under certain conditions may a member be removed, such as when a member is delinquent in paying his/her share towards a group expense. If the system determines that the group member would not like to be removed from a specific group (step 302), the system then determines whether the member would like to change his member details or options (step 314). If the member would like to change his/her options, a "member page" is generated (step 208 of FIG. 2) and the modified details received (step 210 of FIG. 2).

If the member does not want to change his/her options (step 314), the system then determines if any member would like to settle up his/her obligations (pay what is owed) to the group account (step 322). If a member would like to settle up, a "settle up page" is generated (step 324) wherein a member can enter information to settle up his/her obligations, such as financial institution information, account numbers, amounts, etc. This payment information is received (step 330), the account is balanced (step 332), and depending on the page the member was previously viewing, the member is displayed either the group summary page (216 of FIG. 1) or the selected group summary page (222 of FIG. 1).

If a member does not want to settle up, the system determines whether a member would like to ask the other members of a group to settle up (step 334). If the system determines that a member would like to ask the other members of a group to settle up, the system contacts the other members, preferably via email, to settle up the group account (step 336). Depending on the page the member was previously viewing, the member is displayed either the group summary page (216 of FIG. 1) or the selected group summary page (222 of FIG. 1). If the system determines that a member does not want to ask the other members of a group to settle up, the system determines whether the member would like join another existing group (step 504 of FIG. 5).

Figure 5:
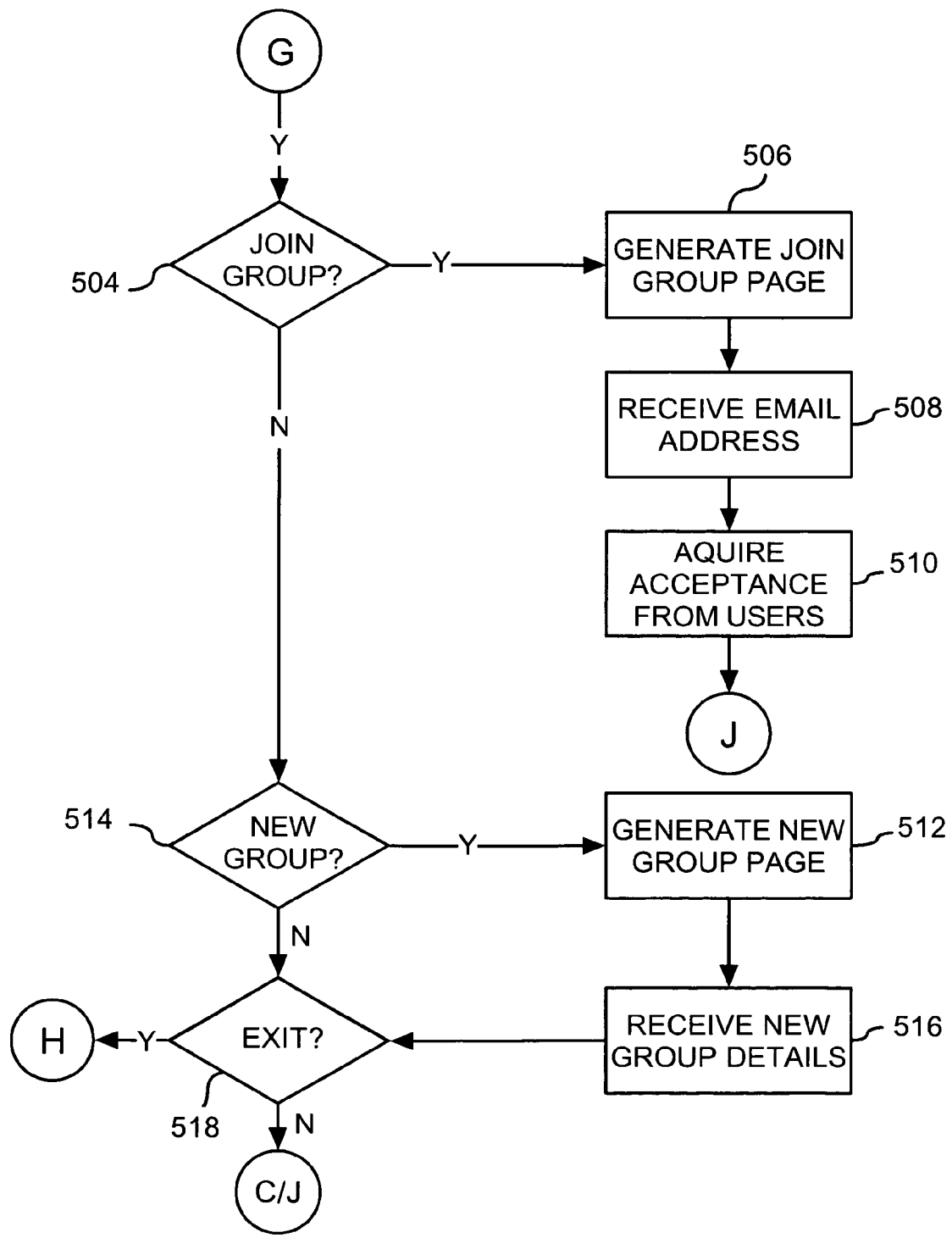
FIG. 5 is a continuation of the flow chart of FIG. 4.
Figure 6:
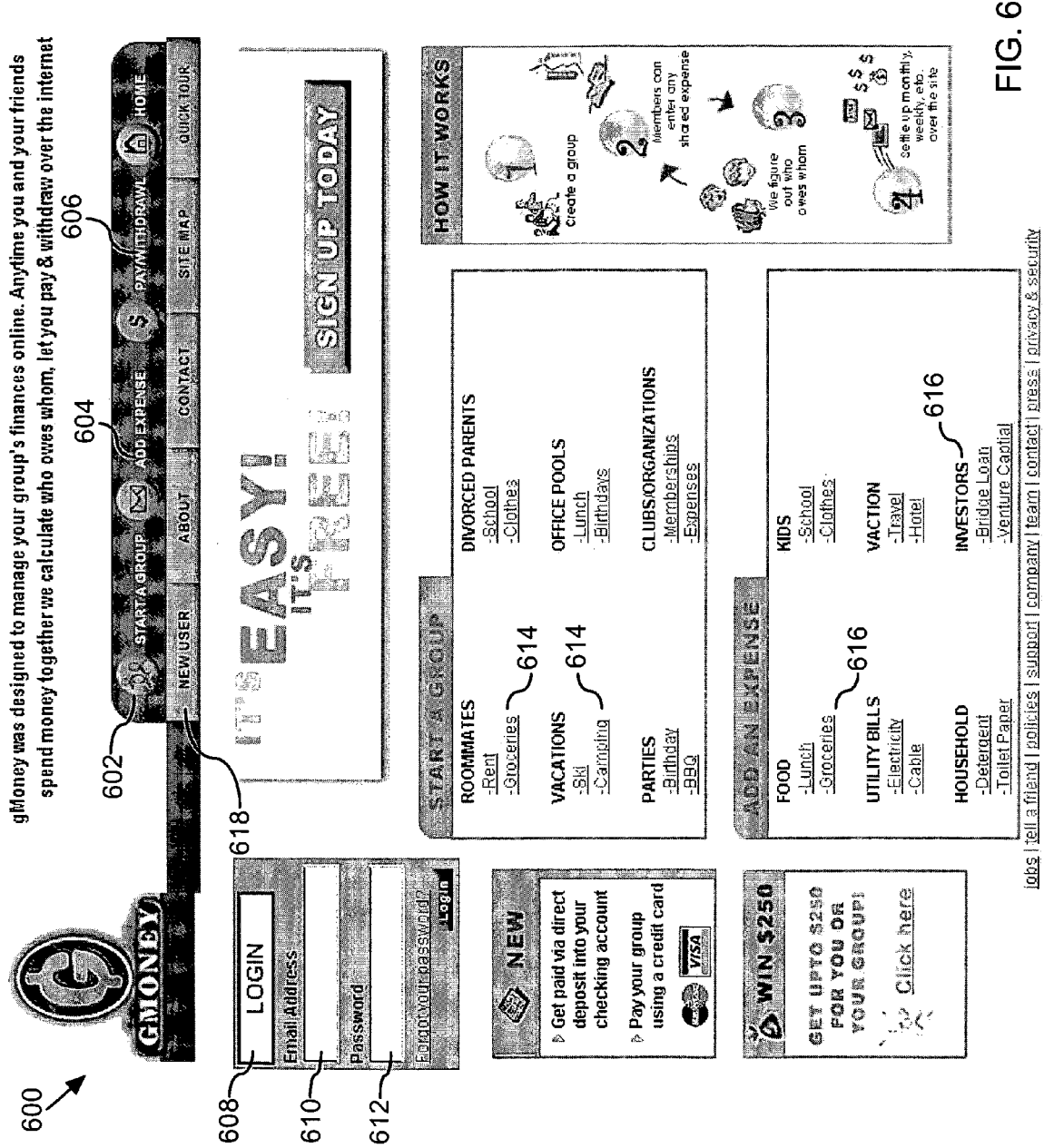
FIG. 6 is an illustration of a graphical user interface of a "Home start page" used in accordance with an embodiment of the invention.
Figure 15:
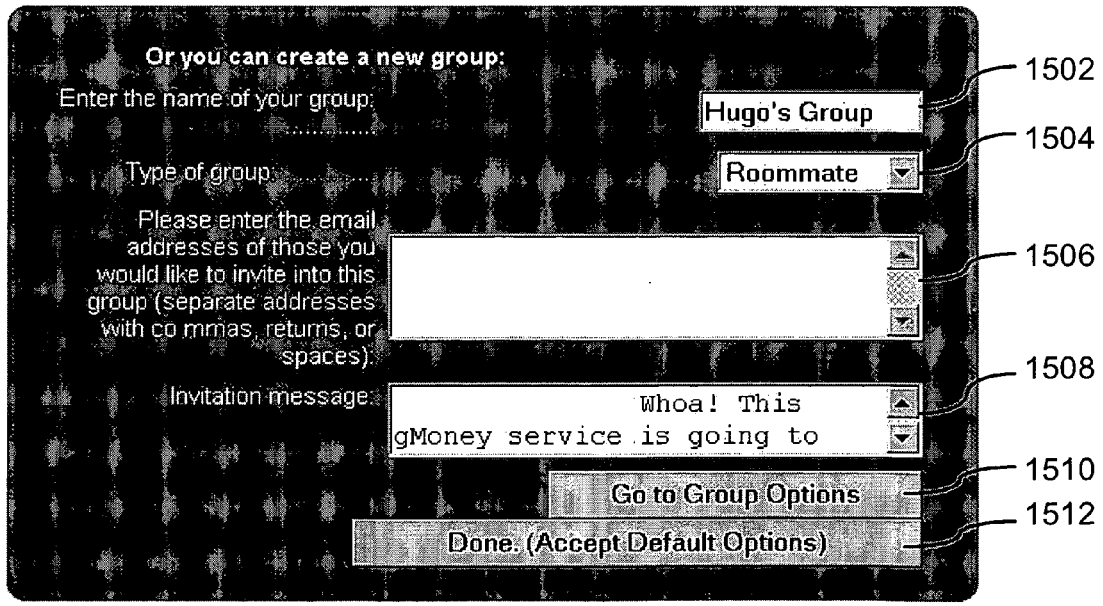
FIG. 15 is an illustration of a graphical user interface of a "Create a new group page" used in accordance with an embodiment of the invention.

FIG. 5 is a continuation of the flow chart of FIG. 4. If the system determines that the member wants to join another existing group, the system generates a "join a new group page" (step 506), an embodiment of which is shown in FIG. 15. Details, such as the members email address, are entered into the join a new group page and received (step 508). If all the other members of the group that the member would like to join accept the member to their group (step 510) the member is added to the group and the group summary page is displayed (step 216 of FIG. 2).

If the system determines that the member does not want to join another existing group (step 504), the system then determines whether the member would like to start a new group (step 514). If the member would like to start a new group, a "new group page" is generated (step 512) and new group details are received (step 516) and saved in a new group profile. The system then determines whether the member would like to exit the system (step 518). If the member would like to exit the system, the member is exited from the secure part of the system and the start page is displayed (step 202 of FIG. 2). If the member does not want to exit the system, either the group summary page (216 of FIG. 1) or the selected group summary page (222 of FIG. 1) is displayed depending on the page the member was previously viewing.

FIG. 6 is an illustration of a graphical user interface of a "Home start page" 600 used in accordance with an embodiment of the invention. To gain access to the system, a member typically enters security details, such as an email 610 address and password 612. If the user is new, he/she may register with the system by clicking on the new user button 618, which will displays a "modify personal info page", similar to that shown in FIG. 7. A member may also start a new group by either clicking on the "Start new group" button 602, or by clicking on any one of a number of standard groups 614 set up for different group activities, such as for joint camping trips. Clicking on either the start new group button 602 or standard groups 614 will display a "Create new group page", as shown in FIG. 15. If the member would like to add an expense to the group account, he/she may do so my clicking on either the "Add expense" button 604 or any one of numerous set expenses 616, such as joint grocery expenses. Clicking on either the add expense button 604 or one of numerous set expenses 616, will display an "Add transaction page", as shown in FIG. 11. A member may also deposit funds, or withdraw funds by clicking on a pay/withdraw button 606. Such withdrawal or deposit may occur electronically, such as via a credit card or electronic check.

FIG. 7 is an illustration of a graphical user interface of a "Member page" 700 used in accordance with an embodiment of the invention. This page is displayed when signing up a new member or when a member modifies his/her details. Details, such as member name 702, email address, and password 704, are entered into the various fields on the page. By clicking on the "Finish" button 708, the member's details are saved into a member profile for that user (130, 132, 138, or 140 of FIG. 1), after which a "group summary page" is displayed, as shown in FIG. 8. Clicking on the cancel button 710 returns the member to the page he/she was previously viewing, without saving the member's details.

FIG. 8 is an illustration of a graphical user interface of a "Group summary page" 800 used in accordance with an embodiment of the invention. Each group 802 that the user belongs to is displayed separately. Various options are provided for each group. Clicking on the "details" button 804 displays further details about the group account displayed in a "Specific group's summary page", as shown in FIG. 9. Clicking on the "remove me" button 808 removes the member from that group. Clicking on the "Settle up" button 806 allows the member to settle up his/her obligations with that group by preferably electronically transferring funds into the group account from the members bank account at a financial institution. Clicking on the "Asks folks to settle up" button 810 balances the group account and contacts the other members of that group, preferably via email, asking them to settle up their financial obligations with the group. A member may add another group or join an existing group by clicking on the "Add/Join a group" button 812. A member may furthermore adjust group options by clicking on the "Personal Options" button 814, after which an "options page" is displayed as per FIG. 13.

FIG. 9 is an illustration of a graphical user interface of a "Specific group's summary page" 900 used in accordance with an embodiment of the invention. This page displays summary details for a specific member in a specific group. Summary details preferably include the member's financial obligations to the group 902 as well as other members' financial obligations to the group 912. Clicking on the "Settle the slush fund" button 904 or the "Request settlement" button 1018 balances the group fund and contacts the other members of that group, preferably via email, asking them to settle up their financial obligations with the group. Clicking on the "Claim cash" button 906 allows the member to withdraw any funds owing to him/her from the group. Withdrawal of funds preferably occurs electronically by transferring funds from the group account to the member's account at a financial institution, but may occur via a credit card or an electronic or traditional check. Clicking on the "Remove/Allocate this" button 908 allows a member to remove himself from a group, thereby allocating any of his financial obligations between the remaining group members. If a potential member has been invited to join the group but has not yet joined, the member may click on the "Invite again" button 914 to contact the potential member to join the group. Likewise, entering an email address into the form provided and clicking on the "Add members" button 916 sends an email to the supplied email address inviting a potential member to join the group. Any member may also post a message to a message-board on the specific group's summary page by clicking on the "Post new message button" 918. A member may add a new transaction by clicking on the "Add new transaction" button 1016 which displays an "Add new transaction page", as shown in FIG. 11. A member may adjust his or her personal options by clicking on the "Personal Options" button 1022. A member can view the groups transaction history by clicking on the "view history" button 1024 which displays a "transaction history page", as shown in FIG. 10. A member may add another group or join an existing group by clicking on the "Add/Join a group" button 1026. A member may adjust a group's options by clicking on the "Group administration" button 1028, after which an "options page" is displayed as per FIG. 13. Finally, the member may return to the group summary page by clicking on the "Group summary" button 1020.

FIG. 10 is an illustration of a graphical user interface of a "Transaction history page" 1000 used in accordance with an embodiment of the invention. This page displays a specific group's transaction history 1032. A member can precisely adjust what part of the transaction history is displayed by entering a date range into forms 1002 and 1004, adjusting the pull down menu to display either an individual member of a group or the entire group 1034, adjusting the pull down menu 1006 to show who entered the transaction into the system, and/or adjusting the pull down menu 1008 to display which categories should be displayed.

Each group has a group type associated with it. So, one may have a "roommate" type group, a "party" type of group, or an "office pool" type of group. Each group has a given set of categories associated with it. Additionally, each group can add group specific categories. Categories preferably include "All categories", expenses, withdrawals, deposits, and any default or custom categories associated with the specific group. After adjusting the dates and pull down menus, the member clicks on the "search" button 1010 to initiate the search for the adjusted transaction history details which are then displayed. Individual transactions may be deleted or modified by clicking on the "delete" 1012 or "modify" 1014 buttons respectively. The member may return to the "specific group's summary page" by clicking on the "Group detail" button 1030.

FIG. 11 is an illustration of a graphical user interface of an "Add new transaction page" 1100 used in accordance with an embodiment of the invention. This page is used by a member to add a new transaction to a group account. A transaction date is set to a default of the date the transaction page is displayed. The member may, however, change this date by modifying the date displayed in the transaction date field 1102. The member then selects a member or members of the group who began or initiated the transaction, such as an individual member, each member, or some or all the members. The member then adjusts a pull down menu 1104 showing what the selected member/s did, such as paid an amount on behalf of the group or deposited an amount into the group. The member enters the amount of the transaction in an amount field 1108. The member then assigns the transaction to individual members, each member, or some or all of the members. Assignment of the transaction is an assignment of the obligation for that transaction. A description of the transaction is entered by adjusting the pull down menu 1110 and 1114. To save the transaction and continue, the member clicks on the "Continue" button 1116. To cancel the transaction without saving the member clicks on the "Cancel" button 1118. If the transaction is complex, i.e. involves a more complex allocation or assignment of the transaction, such as splitting the transaction between group members, a "Complex transaction page" is displayed, as per FIG. 12.

FIG. 12 is an illustration of a graphical user interface of a "Complex transaction page" 1200 used in accordance with an embodiment of the invention. The complex transaction page allows a member to divide expenses up between members of a group. Each part of the split expense amount is entered separately for each member 1202. If a particular member is not responsible for any part of the expense, they may be excluded by checking an "exclude" box 1204. Alternatively, if the amount is to be split evenly between members, the member entering the transaction may click the "Split Evenly" button 1210 which will split the expense evenly between all the members (except those excluded). Clicking on the "Clear" button 1206 clears all split amounts, while clicking on the "Done" button 1208 saves the split amounts, and clicking on the "Cancel" button 1212 exits from this screen without saving.

Figure 13:
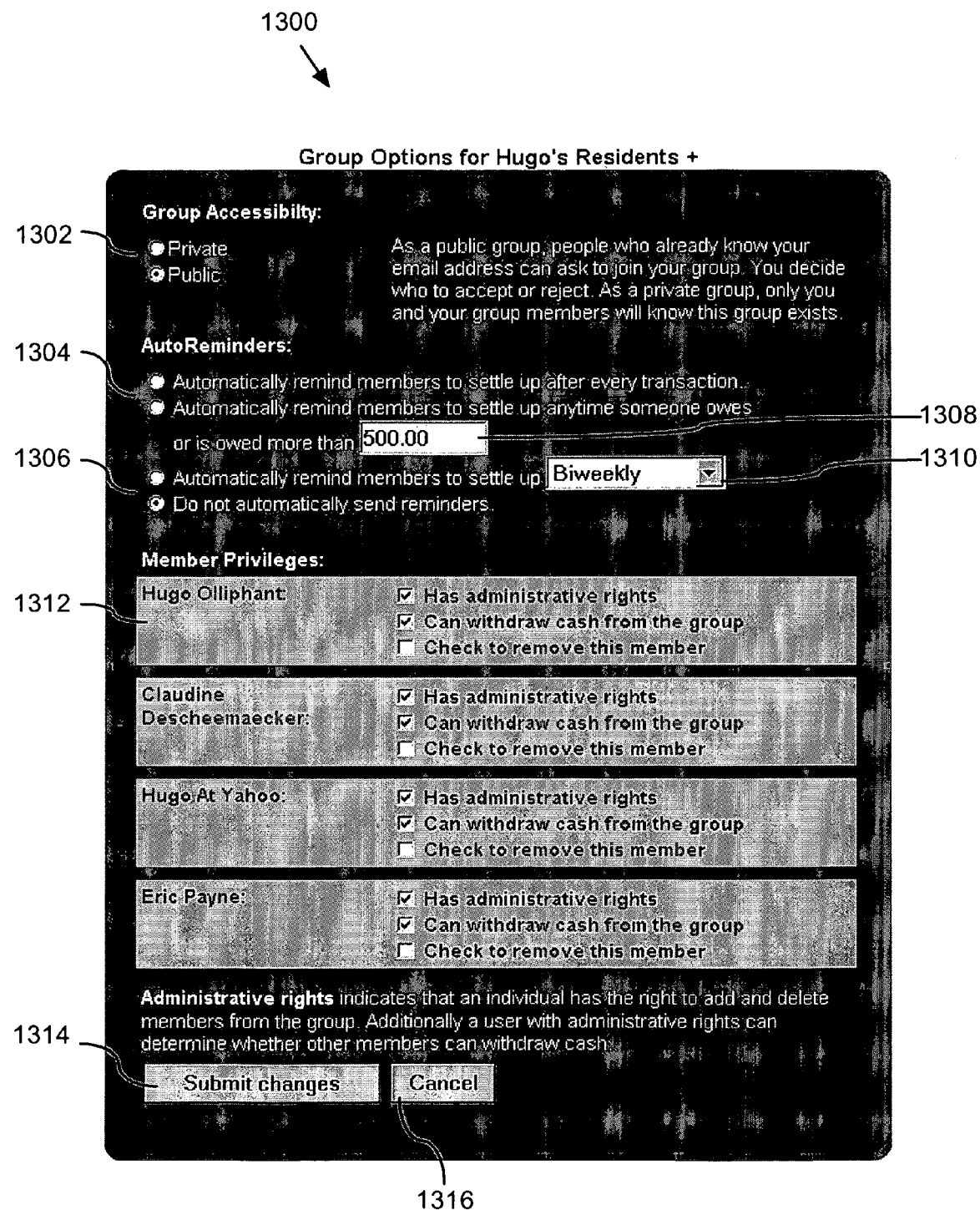
FIG. 13 is an illustration of a graphical user interface of a "Group options page" used in accordance with an embodiment of the invention.

FIG. 13 is an illustration of a graphical user interface of a "Group Options page" 1300 used in accordance with an embodiment of the invention. This page allows members to change the options of a particular group. By selecting the group as either public or private 1302 the members can allow or forbid other individuals to apply to join a group. In the case of a private group, only the members can invite another individual to join a group, where the individual is not made aware of the group prior to such an invitation. The members can also select whether they would like the system to automatically remind members 1304, preferably via email, to settle up after each transaction. Alternatively, the system may be set only to remind members to settle up when someone owes, or is owed, more that a predetermined amount set by the members, such as $500. The members may also select that the system reminds them to settle up after a certain time period, such as biweekly, or not to send automatic reminders at all 1306. Individual privileges for each member may also be set up 1312, such as by giving members of the group administrative rights or allowing them to withdraw cash from the account. An administrative right is preferably the right to modify the group's options, the right to add or delete members from a group, and/or the right to allow other members the right to withdraw cash from the group. Clicking on the "Submit changes" button 1314 saves changes made to the group options, while clicking on the "Cancel" button 1316 exits the member from the screen without saving.

Figure 14:
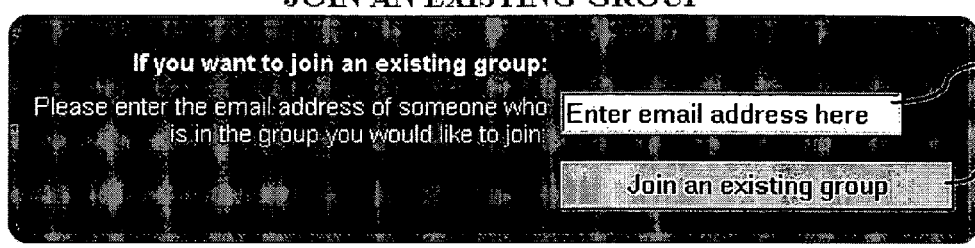
FIG. 14 is an illustration of a graphical user interface of a "Join an existing group page" used in accordance with an embodiment of the invention.

FIG. 14 is an illustration of a graphical user interface of a "Join an Existing Group page" 1400 used in accordance with an embodiment of the invention. By entering their email address 1402 and clicking on the "Join an existing group" button 1404, an email is generated and sent to an existing member of a group to ask if the potential member who entered the email address, may join their group.

FIG. 15 is an illustration of a graphical user interface of a "Create a new group page" 1500 used in accordance with an embodiment of the invention. A new group may be created by entering a new group name 1502, selecting a type of group 1504 from a drop down menu, such as a roommate group, entering the email addresses of those people who the member would like to join the group, and altering the invitation message 1508, if necessary. Clicking on the "Go to group options page" 1510, saves these details in a new group profile (126 and 134 of FIG. 1) and displays the group option page, displayed in FIG. 13, to the founding member so that he or she might adjust the group's options. Clicking on the "Done" button saves the group with default options.

While the foregoing description and drawings represent the preferred embodiment of the present invention, it will be understood that various additions, modifications and substitutions may be made therein without departing from the spirit and scope of the present invention as defined in the accompanying claims. For example, members may pay funds into an account or withdraw funds from an account using a P2P system. In particular, it will be clear to those skilled in the art that the present invention may be embodied in other specific forms, structures, arrangements, proportions, and with other elements, materials, and components, without departing from the spirit or essential characteristics thereof. The presently disclosed embodiments are therefore to be considered in all respects as illustrative and not restrictive, the scope of the invention being indicated by the appended claims, and not limited to the foregoing description. Furthermore, it should be noted that the order in which the process is performed may vary without substantially altering the outcome of the process.

What is claimed is:

1. A method of managing group finances for a group that includes a plurality of group members via an electronic network, the method comprising:
   establishing a group fund corresponding to at least one shared expense of the group;
   receiving transaction details from a member of the group via an electronic network, said transaction details describing a group expense and identifying at least one of the plurality of group members responsible for said group expense;
   assigning said transaction details to said group; and
   allocating said group expense specified by said transaction details among group members of said group.

2. The method of claim 1, further comprising repeating said receiving, assigning, and allocating steps for a plurality of transactions.

3. The method of claim 1, further comprising balancing finances of said group.

4. The method of claim 3, wherein said balancing includes:
   rounding up an original expense value to a new expense value having a predefined number of decimal places; and
   distributing a difference between said new expense value and said original expense value to a third party.

5. The method of claim 1, wherein said receiving comprises acquiring transaction details which include a shared expense containing an expense amount and at least one group member responsible for said expense.

6. The method of claim 1, wherein said receiving comprises acquiring transaction details which include remuneration details from a group member.

7. The method of claim 1, wherein said receiving comprises acquiring allocation details dividing financial obligations of said group among said group members.

8. The method of claim 1, wherein said establishing comprises:
   acquiring group fund details; and
   storing said group fund details in a group fund database.

9. The method of claim 1, wherein said allocating includes:
   debiting said group fund with an expense specified in said transaction details; and
   allotting said expense among said group members in a manner specified in said transaction details.

10. The method of claim 1, wherein said allocating includes:
    crediting said group fund with remuneration specified in said transaction details; and
    allotting said remuneration among said group members in a manner specified in said transaction details.

11. The method of claim 1, further comprising settling said group fund via said electronic network.

12. The method of claim 11, wherein said settling comprises accepting electronic deposits into said group fund.

13. The method of claim 12, wherein said accepting comprises collecting a credit card electronic deposit into said group fund.

14. The method of claim 12, wherein said accepting comprises collecting an electronic check deposit into said group fund.

15. The method of claim 11, wherein said settling comprises transferring funds from said group fund to a financial institution account of a group member.

16. The method of claim 1, further comprising emailing group members to notify them of their outstanding balance in said group fund.

17. The method of claim 1, wherein said receiving includes receiving said transaction details from a form appearing in a web page.

18. The method of claim 1, wherein said allocating further includes generating a web page interface with a form reporting allocated expenses.

19. The method of claim 1, wherein said receiving includes acquiring an authorization of payment of the group expense from said group members.

20. The method of claim 1, wherein said group expense described in said transaction details corresponds to the purchase of one of goods or services.

21. The method of claim 1, wherein said at least one shared expense of the group that said group fund corresponds to corresponds to a future purchase of one of goods or services.

22. The method of claim 1, wherein said transaction details describe a payment made by at least two members of the group on behalf of the group.

23. The method of claim 1, further comprising charging a group member interest for paying said group fund late.

24. The method of claim 1, further comprising determining that a group member has made an early payment and paying said group member interest on the amount of the payment until said payment is due.

25. The method of claim 1, further comprising determining that one group member is delinquent in paying his share of a group expense and removing said one group member from said group.

26. The method of claim 1, comprising determining whether one member of the group would like to ask other members of said group to settle up, and if so to contact said other members via the electronic network to settle up.

27. The method of claim 1, wherein said transaction details describe an amount paid by at least two of the group members on behalf of the group.

28. The method of claim 1, wherein said transaction details specify a plurality of, but not all of, the group members to assign said transaction to.

29. The method of claim 1, further comprising determining when any of the group members owes more than a predetermined amount of money, and subsequently reminding said any of the group members via e-mail to settle up.

* * * * *

UNITED STATES PATENT AND TRADEMARK OFFICE
CERTIFICATE OF CORRECTION

PATENT NO.        : 7,343,335 B1
APPLICATION NO. : 09/633962
DATED             : March 11, 2008
INVENTOR(S)       : Olliphant Page 1 of 1

It is certified that error appears in the above-identified patent and that said Letters Patent is hereby corrected as shown below:

In the Drawings On sheet 4 of 12, in Fig. 4 (Box No. 418), line 2, delete "DELETD" and insert -- DELETED --, therefor.

In the Drawings On sheet 5 of 12, in Fig. 5 (Box No. 510), line 1, delete "AQUIRE" and insert -- ACQUIRE --, therefor.

In column 3, line 12, delete "invention;" and insert -- invention. --, therefor.

In column 4, line 36, delete "®" and insert -- ®) --, therefor.

In column 6, line 63, delete "expense" and insert -- the expense --, therefor.

In column 7, line 26, delete "an" and insert -- a --, therefor.

Signed and Sealed this

Thirtieth Day of September, 2008

JON W. DUDAS
*Director of the United States Patent and Trademark Office*